| United States Patent [19] | [11] Patent Number: 4,894,411 |
| Okada et al. | [45] Date of Patent: Jan. 16, 1990 |

[54] COMPOSITE MATERIAL AND PROCESS FOR PRODUCING THE SAME

[75] Inventors: Akane Okada; Masaya Kawasumi; Masao Kohzaki; Megumi Fujimoto; Yoshitsugu Kojima; Toshio Kurauchi; Osami Kamigaito, all of Aichi, Japan

[73] Assignee: Kabushiki Kaisha Toyota Chuo Kenkyusho, Aichi, Japan

[21] Appl. No.: 168,133

[22] Filed: Mar. 14, 1988

[30] Foreign Application Priority Data

Mar. 18, 1987 [JP] Japan ................................. 62-63365
Jul. 3, 1987 [JP] Japan ................................. 62-167250

[51] Int. Cl.$^4$ .......................... C08K 3/34; C08K 5/13; C08K 5/17; C08K 5/52
[52] U.S. Cl. .................................. 524/710; 524/714; 524/736; 524/739; 524/789; 524/791
[58] Field of Search ............... 524/789, 790, 791, 710, 524/714, 736, 739

[56] References Cited

U.S. PATENT DOCUMENTS

| 3,419,517 | 12/1968 | Hedrick | 524/790 |
| 3,883,469 | 5/1975 | Brassat | 524/789 |
| 4,739,007 | 4/1988 | Okada | 524/789 |

FOREIGN PATENT DOCUMENTS 3632865 4/1987 Fed. Rep. of Germany .

*Primary Examiner*—Lewis T. Jacobs
*Assistant Examiner*—David Buttner
*Attorney, Agent, or Firm*—Oblon, Spivak, McClelland, Maier & Neustadt

[57] ABSTRACT

Provided herein is a composite material which comprises a polyamide-containing resin, a layered silicate dispersed therein, and a substance such as polyamine which controls the crystalline structure or molecular structure of the resin. The composite material has improved mechanical strength and toughness and high clarity or transparency.

12 Claims, No Drawings

COMPOSITE MATERIAL AND PROCESS FOR PRODUCING THE SAME

BACKGROUND OF THE INVENTION

1. Field of the Invention

The present invention relates to a composite material having high mechanical strength, toughness, and clarity, and also to a process for producing the same. The composite material is composed of a resin composition containing a polyamide and a layered silicate constituting a clay mineral which are bonded to each other through ionic bond and are uniformly mixed with each other.

2. Description of the Related Art

Various attempts have been made so far to incorporate an organic polymeric material with an inorganic material such as calcium carbonate, clay mineral, and mica for the improvement of its mechanical properties. As the result of such attempts, the present inventors developed a composite material composed of a resin containing a polyamide and a layered silicate having a layer thickness of 7–12 Å uniformly dispersed therein, with the polymer chain of said polyamide being partly connected to said silicate through ionic bond. (See Japanese Patent Laid-open No. 74957/1987 (which corresponds to U.S. Pat. No. 4,739,007).) This composite material has a high elastic modulus and heat resistance because of its unique structure; that is, silicate having an extremely high aspect ratio are uniformly dispersed in and connected to a polyamide resin through ionic bond. This composite material, however, is subject to brittle fracture even at room temperature under a comparatively small load. Therefore, it is not necessarily satisfactory in mechanical strength.

In the meantime, the crystalline polyamide resin as a typical engineering plastics exemplified by nylon-6 and nylon-66 finds use as automotive parts and electric and electronic parts on account of its high melting point and high rigidity. A disadvantage of the crystalline polyamide resin is that it is opaque on account of its crystalline structure. This leads to a problem arising from the fact that automotive parts such as reservoir tanks, radiator tanks, and fuel tanks made of polyamide resin make the liquid level invisible from outside and the electronic parts such as connectors made of polyamide resin prevent the detection of conductor breakage therein.

Unlike the crystalline polyamide resin, the amorphous polyamide resin having the aromatic skeleton structure is transparent. An example of the amorphous polyamide resin is "Trogamid" made by Dynamit Nobel Co., Ltd. Unfortunately, it is extremely expensive and cannot be a substitute for aliphatic nylons such as nylon-6 and nylon-66. Moreover, the aliphatic nylon extremely decreases in strength and heat resistance when it is made amorphous. Under these circumstances, there has been a demand for a polyamide resin which has high clarity without decrease in crystallinity.

The above-mentioned polyamide-silicate composite material developed by the present inventors has a higher clarity than a polyamide resin; but the clarity is not so high as to solve the above-mentioned problems involved in automotive parts and electronic parts.

In order to eliminate the above-mentioned disadvantages, the present inventors carried out a series of researches, which led to the present invention.

SUMMARY OF THE INVENTION

The first object of the present invention is to provide a composite material superior in mechanical strength and toughness.

The second object of the present invention is to provide a composite material superior in clarity or transparency.

The third object of the present invention is to provide a process for producing the above-mentioned composite material having superior properties.

The composite material of the present invention comprises a resin containing a polyamide, a layered silicate dispersed therein which has a layer thickness of 7–12 Å distance greater than 30 Å, and an additive to control the crystalline structure or molecular structure of the resin.

The process of the present invention for producing a composite material comprises a contacting step of contacting a layered clay mineral having a cation exchange capacity of 50 to 200 milliequivalents per 100 g with a swelling agent, thereby forming a complex which has the property of being swollen by a molten polyamide monomer, a mixing step of mixing said complex with a monomer of polyamide, and a polymerization step of polymerizing said monomer contained in said mixture by heating said mixture, and adding a substance to control the crystalline structure or molecular structure of the polyamide-containing resin in at least any one of said steps.

The composite material of the present invention is superior in mechanical strength and toughness, and also in clarity or toughness.

The above and other objects, features, and advantages of the present invention will become more apparent from the following description in which a preferred embodiment of the invention is shown by way of illustrative example.

DETAILED DESCRIPTION OF THE INVENTION

The composite material of the present invention comprises a resin, a layered silicate, and an additive which is a substance to control the crystalline structure or molecular structure of the resin.

The resin used in the composite material of the present invention is a resin containing a polyamide. In other words, it is a polyamide resin or a mixture of a polyamide and a polymer other than polyamide. The term "polyamide" is a generic name denoting the polymer having an acid amide bond (—CONH—). It includes, for example, nylon-6, nylon-66, and nylon-11. The higher the polyamide content, the better the composite material. Even though the polyamide content is 10 wt %, the desired effect of the invention can be achieved. The polyamide resin used in the invention is a crystalline one. The crystalline polyamide resin is a polymeric compound which has a definite melting point in differential thermal analysis and also has amide groups in the main chain. It may be a homopolymer, copolymer, or a mixture thereof. Examples of the crystalline polyamide resin include nylon-6, nylon-66, nylon-11, nylon-12, nylon-46, nylon-7, and nylon-8. They are used alone or in combination with one another.

The above-mentioned layered silicate imparts superior mechanical properties and heat resistance to the polymeric material. It is a phyllosilicate mineral composed of magnesium silicate layers or aluminum silicate layers having a thickness of 7–12 Å. It is a constituent of layered clay mineral. The layered silicate is negatively charged on account of the isomorphous ion exchange. They differ from one another in characteristic properties depending on the density and distribution of the negative charges. The preferred layered silicate in the present invention is one in which one negative charge occupies an area of 25–200 $Å^2$ on the layer surface. The layered silicate suppresses the growth of crystalline grains and improves the clarity of the resin through the interaction with the above-mentioned additive.

The content of the layered silicate in the composite material should preferably be 0.05 to 150 parts by weight for 100 parts by weight of the resin. With a content less than 0.05 parts by weight, the layered silicate is not enough to produce the desired reinforcing effect. Conversely, with a content more than 150 parts by weight, the resulting product is merely an unmoldable powder of interlayer compound because of the excessively small resin content, and it is poor in clarity. Therefore, the preferred content is 1 to 20 parts by weight for 100 parts by weight of the resin.

The above-mentioned additive is intended to improve the mechanical properties, toughness, and clarity of the composite material. It controls the crystalline structure or molecular structure of the resin through interaction with the above-mentioned layered silicate, thereby imparting the above-mentioned properties to the composite material. Examples of the additive include polyamines, stabilizers, coloring agents, lubricants, flame retardants, and nucleating agents. They are used alone or in combination with one another.

The polyamine is intended to give each polyamide molecule a plurality of ionic bonding sites. Examples of the polyamine include diamines (such as hexamethylenediamine, dodecamethylenediamine, trimethylhexamethylenediamine, polyoxypropylenediamine, polybutadienediamine, 4,4′-diaminodicyclohexylmethane, and m-xylylenediamine), triamines (such as diethylenetriamine, dipropylenetriamine, and bis-(hexamethylene)triamine), tetramines (such as triethylenetetramine), pentamines (such as tetraethylenepentamine), and aliphatic polyamines. They are used alone or in combination with one another.

Examples of the above-mentioned stabilizers include phenol derivatives, organophosphoric compounds, nitrogen-containing heterocyclic compounds, aromatic amines, and copper compounds. They are used alone or in combination with one another. Preferable stabilizers among them are phenol derivatives and organophosphoric compound. Specific examples of the stabilizers include 2,4-di-t-butyl-p-cresol, 1,3,5-trimethyl-2,4,6-tris(3,5-di-t-butyl-4-hydroxybenzyl)benzene, N,N′-hexamethylenebis(3,5-di-t-butyl-4-hydroxy-hydrocinnamamide, tris-(3,5-di-t-butyl-4-hydroxybenzyl)isocyanurate, triethyleneglycol-bis-[3-(3-t-butyl-5-methyl-4-hydroxyphenyl)propionate], and tris(2,4-di-t-butylphenyl)phosphite.

Examples of the above-mentioned coloring agents include anthraquinone dyes, rhodamine dyes, phthalocyanine pigments, carbon black, and cadmium sulfide. They are used alone or in combination with one another.

Examples of the above-mentioned lubricants include molybdenum disulfide and graphite. They are used alone or in combination with one another.

Examples of the above-mentioned flame retardants include metal oxides and metal halides (said metal are such as zinc, iron, and tin). They are used alone or in combination with one another.

Examples of the above-mentioned nucleating agents include metal salts of phosphoric acid and stearic acid, talc, and sodium phenylphosphinate. They are used alone or in combination with one another.

In the case where the additive is a polyamine, the content of the additive in the composite material should preferably be 0.0002 to 100 parts by weight for 100 parts by weight of the resin. With a content less than 0.0002 parts by weight, the resulting composite material does not have the improved strength and toughness. With a content higher than 100 parts by weight, the molecular weight of the resin decreases to a great extent on account of the unbalanced terminal groups. In the case where the additive is a compound other than polyamine, the content of the additive in the composite material should preferably be 0.05 to 5 parts by weight for 100 parts by weight of the resin. With a content less than 0.05 parts by weight, the resulting composite material does not have the improved clarity. With a content in excess of 5 parts by weight, the polyamide resin is plasticized excessively and the resulting composite material has low strength, rigidity, and heat resistance.

As mentioned above, the composite material of the present invention is composed of a resin and a layered silicate dispersed therein in the level of molecule. The resin has a cross-linked structure on account of a strong interaction (such as ionic bond) between the resin and the layered silicate. In other words, the individual layers of the layered silicate are completely separated from one another by the force greater than the bond strength (such as van der Waals' forces and electrostatic attractive forces) between the layers. Moreover, the negative charge on the layer is connected to the positive charge in the resin through ionic bond.

The additive contained in the composite material controls the crystalline structure or molecular structure of the resin, thereby micronizing the crystal grains such as spherulites or giving a plurality of onium ion groups to each polyamide molecule. Thus it imparts the improved mechanical properties, toughness, and clarity to the composite material. In the case where a polyamine is used as the additive, the polyamine causes the polyamide chains and the silicate to be connected to each other through ionic bond at two or more sites on each polymer chain. The composite material has such a structure that the layered silicate, which is the constituting unit of clay mineral and is negatively charged, is connected to the onium ion group through ionic bond. The onium ion group is present in the organic ion. Examples of the onium ion group include ammonium ion ($NH_3^+$), group, trimethylammonium ion ($-N^+(CH_3)_3$) group, trimethylphosphonium ion ($-P^+(CH_3)_3$) group, and dimethylsulfonium ion ($-S^+(CH_3)_2$) group. These groups are connected to the main chain, side chains, or terminals of the polyamide through covalent bond. Each polyamide molecule contains a plurality of ion groups such as onium ions, which are connected to the silicate through ionic bond. Therefore, ionic bond with the silicate takes place at two or more sites on the polyamide polymer. There may be the same silicates on the ionic bond site of the polyamide. However, it is desirable that there should be different silicates, for silicates are connected to one another through polyamide and the resulting composite material has superior mechanical properties.

In the case where the additive is a substance other than polyamine, it is considered that the additive is uniformly dispersed or dissolved in the resin, and it is connected to the resin by van der Waals' forces. The additive suppresses the growth of the crystal grains of the resin through the interaction with the layered silicate, thereby reducing the diameter of the spherulite. It is desirable that the polyamide-containing resin in the composite material should have the maximum spherulite diameter of 1 μm or below which is observed under a polarization microscope. The reason why the maximum spherulite diameter is 1 μm or below is that the spherulite diameter is very broadly distributed and most spherulites are smaller than 0.1 μm in diameter if the maximum spherulite diameter is 1 μm or below. Spherulites smaller than 0.1 μm in diameter scatter visible light (0.7–0.4 μm in wavelength) only a little.

The composite material of the present invention has superior mechanical properties and toughness. The mechanism by which it exhibits such outstanding performance is not yet fully elucidated. However, it is assumed as follows: In the case where a polyamine is used as the additive, the silicate molecules are connected to a plurality of sites on the polyamide chains through ionic bond and the bond between silicate molecules through polyamide molecules takes place (in the case of nylon-6 and nylon-12) or increases (in the case of nylon-66, nylon-610, and nylon-46). In other words, the three-dimensional crosslinking structure formed through silicate molecules in polyamide molecules takes place or increases. This crosslinked structure imparts the improved mechanical properties and toughness to the composite material.

In the case where a substance other than polyamine is used as the additive, the additive is uniformly dispersed or dissolved in the resin and it functions as a nucleus for crystal growth. In other words, the resin containing such an additive contains much more nucleus for crystal growth than the resin not containing such an additive. The presence of a large number of nuclei prevents the growth of crystal grains such as spherulites, resulting in the formation of fine crystal grains. In this case, the additive prevents the growth of crystal grains (spherulites) of the resin in concert with the layered silicate, with the result that the polyamide resin contains spherulites of small diameter which do not scatter visible light. Therefore, the polyamide resin has improved clarity.

The layered silicate and additive prevent the growth of the spherulites of the polyamide resin, but they do not interfere with the crystallization of the polyamide. Therefore, the polyamide resin in the composite material of the present invention retains its high rigidity and high heat resistance.

The composite material of the present invention is produced by a contacting step of contacting a layered clay mineral with a swelling agent, thereby forming a complex, a mixing step of mixing said complex with a monomer of polyamide, and a polymerization step of polymerizing said monomer contained in said mixture by heating said mixture, and adding the above-mentioned additive. The additive may be added in any one of the steps, but a polyamine should preferably be added in either or both of the mixing step and polymerization step, and an additive other than polyamine should preferably be added in the polymerization step (before or during polymerization), more preferably in the later stage of polymerization. The individual steps will be explained in more detail in the following.

In the contacting step, a layered clay mineral having a cation exchange capacity of 50–200 milliequivalents per 100 g is brought into contact with a swelling agent so that the clay mineral adsorbs the swelling agent. The product obtained in this step is a complex which has the property of being swollen by a molten polyamide monomer. The clay mineral in the complex is characterized by its interlayer distance increases in the subsequent polymerization step. The contacting step may be accomplished by soaking a clay mineral in an aqueous solution containing a swelling agent, followed by rinsing for the removal of excess ions, or by bringing an aqueous suspension of a clay mineral into contact with a cation exchange resin which has undergone ion exchange with a swelling agent. In the former process, the clay mineral is dispersed into a dispersion medium using a mixer and a separately prepared solution of swelling agent is added dropwise to the dispersion. The resulting product is filtered and washed with the dispersion medium several times to remove the unreacted swelling agent.

The complex formed in the contacting step may be used in the subsequent mixing step after the removal of the dispersion medium. Alternatively, it may be used in the form which contains the dispersion medium. In the latter case, the content of the dispersion medium should be reduced to 100 to 3000 parts by weight for 100 parts by weight of the clay mineral. With a content of the dispersion medium less than 100 parts by weight, the clay mineral and polyamide monomer are not readily mixed uniformly. With a content of the dispersion medium more than 3000 parts by weight, the removal of the dispersion medium by distillation from the composite material takes an excessively long time in the polymerization process.

The clay mineral may be any natural or synthetic one which has a cation exchange capacity of 50 to 200 milliequivalents per 100 g and also has a large area for contact with the monomer with which to react. Examples of the clay mineral include smectite clay minerals (such as montmorillonite, saponite, beidellite, nontronite, hectorite, and stevensite); and vermiculite and halloysite. The clay mineral is required to have a cation exchange capacity of 50 to 200 milliequivalents per 100 g. With a capacity greater than the upper limit, the clay mineral does not provide the desired composite material on account of the high interlayer bond strength. With a capacity smaller than the lower limit, the clay mineral does not sufficiently adsorb the swelling agent (organic cations or inorganic cations), which is indispensable in the process of the present invention, and hence does not provide the desired composite material. Incidentally, the clay mineral should preferably be ground beforehand into particles of desired shape and size by means of a mixer, ball mill, vibration mill, pin mill, jet mill, or the like.

The swelling agent has three functions. It expands the interlayer distance of the clay mineral. It permits the clay mineral to take polymer into the interlayer space of the silicate. It eventually combines with the polymer and connects the polymer molecules to the silicate through ionic bond. It is a compound having an onium ion group and a functional group capable of reacting and bonding with polyamide. Examples of the onium ion include ammonium ion ($-NH_3^+$) group, trimethylammonium ion ($-N^+(CH_3)_3$), trimethyl phosphonium ion ($-P^+(CH_3)_3$) group, and dimethyl sulfonium ion ($-S^+(CH_3)_2$) group. Examples of the functional group include carboxyl group and epoxy group. The preferred swelling agent is one which forms an onium ion having a carboxyl group represented by (X+—R—COOH), where X+ is an onium ion such as ammonium ion (—NH$_3$+) and R is an alkylene group (including a polymethylene group) represented by —(CH$_2$)$_n$— and may also contain therein a linkage of phenylene group

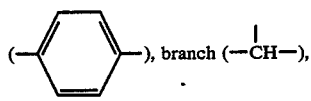

or vinylene group (—HC=CH—). Examples of the swelling agent include 4-amino-n-butyric acid ion (—NH$_3$+C$_3$H$_6$COOH), 6-amino-η-caproic acid ion (—NH$_3$+C$_5$H$_{10}$COOH), 8-aminocaprylic acid ion (—NH$_3$+C$_7$H$_{14}$COOH), 10-aminodecanoic acid ion (—NH$_3$+C$_9$H$_{18}$COOH), 12-aminododecanoic acid ion (—NH$_3$+C$_{11}$H$_{22}$COOH), 14-aminotetradecanoic acid ion (—NH$_3$+C$_{13}$H$_{26}$COOH), 16-aminohexadecanoic acid ion (—NH$_3$+C$_{15}$H$_{30}$COOH), and 18-aminooctadecanoic acid ion (—NH$_3$+C$_{17}$H$_{34}$COOH). They may be used alone or in combination with one another.

In the mixing step, the complex of clay mineral and swelling agent obtained in the above-mentioned contacting step is mixed with a polyamide monomer. The polyamide monomer is the base of the composite material; upon polymerization, it forms a polyamide or a mixture composed of a polyamide and a polymer other than polyamide. Examples of the polyamide monomer include amino acids (such as 6-amino-η-caproic acid and 12-aminododecanoic acid), nylon salts (such as hexamethylenediamine adipate salt), and lactams (such as caprolactam, valerolactam, and dodecanolactam). In the case where a lactam is used, it is desirable to add 1-20 parts by weight of ω-amino acid to 100 parts by weight of the lactam in order to accelerate the reaction. The mixing of the complex and polyamide monomer is accomplished by mechanical means. As the result of mixing, there is obtained a mixture composed of the polyamide monomer and the complex dispersed therein.

The mixture obtained in the mixing step may be used as such in the subsequent polymerization step or it may be used after the dispersion medium in the mixture has been distilled away. The distillation of the dispersion medium may be accomplished by heating the mixture in a nitrogen stream. The heating temperature is 120° to 220° C. in the case where the dispersion medium is water.

In the polymerization step, the mixture obtained in the above-mentioned mixing step is heated to a prescribed temperature so that the polyamide monomer in the mixture is polymerized. The polymerization may be carried out by heating to a prescribed temperature immediately after the mixing. However, a better result is obtained if the mixture is heated to a temperature just above the melting point of the monomer and the clay mineral is uniformly dispersed into the monomer. Polymerization catalysts and polymerization accelerators may be added during polymerization. In the polymerization step, it is desirable to stir the reactants (preferably at 60 rpm or over) to completely disperse the clay mineral and additive and to suppress the growth of the crystal grains of polyamide resin.

In the case where a polyamine is used as the additive, the resulting composite material has such a structure that there are two or more sites of ionic bond on each polymer chain of polyamide resin. In other words, the reaction of the polyamide resin with the polyamine forms two or more amino groups in one polyamide molecule, and these amino groups react with the swelling agent. As the result, two or more sites of ionic bond are formed on each polyamide chain. In the case where a polyamine is not added as the additive, there is only one site for ionic bond, that is, on the N-terminal on each polymer chain of the polyamide resin in the case of nylon-6 and nylon-12. However, this is not the case with nylon-66, nylon-610, and nylon-46. They sometimes have the sites for ionic bond at both terminals but they usually have the site for ionic bond only at one terminal or they lack the site for ionic bond.

The polyamine should be added in such an amount that the amount of the amino group in the polyamine is 0.2-2.0 equivalents for the total ion exchange capacity of the clay mineral in the mixture. If the amount of the polyamine added is less than the lower limit, there is not sufficient polyamide which has a plurality of the sites for ionic bond, and hence the desired modifying effect is not obtained. Conversely, with an amount in excess of the upper limit, the polyamide decreases in molecular weight on account of the excess amine component.

The polyamine may be added in either or both of the above-mentioned mixing step and polymerization step. In other words, the polyamine may be added to the system when the complex and polyamide monomer are mixed, or when the mixture is heated and the polyamide monomer is polymerized. Alternatively, it may be added in the mixing step and also in the polymerization step. In the case where the polyamine is added in the polymerization step, the timing of addition may be before, during, or after the polymerization of the polyamide monomer in the mixture. However, it is desirable to add the polyamine before the polyamide monomer in the mixture is polymerized in the polymerization step or it is desirable to add the polyamine in the mixing step. If the polyamine is added during or after the polymerization in the polymerization step, uniform mixing is not effected because the reaction system has a high viscosity.

The composite material obtained as mentioned above may be made into molded products by injection molding or compression molding directly or after mixing with a proper amount of a polymer other than polyamide. Alternatively, it is also possible to obtain molded products by performing the above-mentioned polymerization reaction in a mold. The polyamide composite material of the present invention will find use as automotive parts such as reservoir tanks, radiator tanks, and fuel tanks, and electronic parts such as connectors by virtue of its high rigidity, heat resistance, strength, and clarity.

The invention will be more clearly understood with reference to the following examples.

EXAMPLE 1

One hundred grams of montmorillonite from Yamagata Prefecture, Japan (having a cation exchange capacity of 119 milliequivalents per 100 g and a layer thickness of 10 Å) was dispersed in 1.75 liters of water. To the dispersion were added 51.2 g of 12-aminododecanoic acid and 6 ml of conc. hydrochloric acid, followed by stirring at 80° C. for 60 minutes. After thorough washing with water, the complex composed of montmorillonite and 12-aminododecanoic acid was collected by filtration under reduced pressure using a Büchner funnel.

In a reactor equipped with a stirrer were placed 5.8 g of the complex, 100 g of ε-caprolactam, 12.9 g of 6-amino-η-caproic acid, and 0.3 g of hexamethylenediamine (0.5 equivalents for the ion exchange capacity of the montmorillonite). Polymerization was carried out at 270° C. with stirring under a nitrogen stream. The resulting polymer was crushed, washed with hot water, and dried in vacuo. Thus there was obtained a composite material. The X-ray diffractometry of this composite material gave no peak attributable to the (001) plane of montmorillonite. This indicates that the layers of montmorillonite are uniformly dispersed in the composite material.

EXAMPLE 2

The same procedure as in Example 1 was repeated to produce a composite material except that the ε-caprolactam and 6-amino-η-caproic acid as the polyamide monomer were replaced by 129 g of nylon-66 salt. The X-ray diffractometry of this composite material gave no peak attributable to the (001) plane of montmorillonite, suggesting that the composite material is uniform.

COMPARATIVE EXAMPLE 1

The same procedure as in Example 1 was repeated to produce a composite material except that the hexamethylenediamine was not added.

COMPARATIVE EXAMPLE 2

The same procedure as in Example 2 was repeated to produce a composite material except that the hexamethylenediamine was not added.

EXPERIMENT EXAMPLE

Four kinds of the composite materials obtained in the above-mentioned examples were injection-molded into test pieces, which underwent tensile test and impact test according to ASTM D638M and JIS K7111. The results are shown in Table 1.

TABLE 1

|  | Tensile test | | Impact test |
|---|---|---|---|
|  | Strength at break (MPa) | Tensile elongation (%) | Charpy impact (without notch) ($\times 10^4$ J/m$^2$) |
| Example 1 | 97 | 7.6 | 8.0 |
| Comparative Example 1 | 78 | 5.6 | 2.8 |
| Example 2 | 110 | 7.5 | 8.8 |
| Comparative Example 2 | 82 | 4.3 | 2.5 |

It is noted from Table 1 that the composite materials of the present invention are superior in tensile strength, elongation, and impact strength to the composite materials in Comparative Examples. It is considered that the superior properties are attributable to the ionic bond between the polyamide chain and the silicate which takes place at two or more sites on each polyamide chain.

EXAMPLE 3

One hundred grams of montmorillonite from Yamagata Prefecture, Japan was dispersed in 1.75 liters of water. To the dispersion were added 51.2 g of 12-aminododecanoic acid and 6 ml of conc. hydrochloric acid, followed by stirring at 80° C. for 60 minutes. After thorough washing with water and filtration under reduced pressure using a Büchner funnel, there was obtained a water-containing complex composed of montmorillonite and 12-aminododecanoic acid. The water content of the complex was 90%.

In a reactor equipped with a stirrer were placed 53 g of the complex, 90 g of ε-caprolactam, and 10 g of 6-aminocaproic acid. The reactants were kept at 180° C. for 2 hours with stirring at 100 rpm under a nitrogen stream. During this period, water was distilled away. The reactants were heated to 250° C. and polymerization reaction was carried out with stirring at 100 rpm for 2.5 hours. To the reaction system was added 2 g of 1,3,5-trimethyl-2,4,6-tris(3,5-di-t-butyl-4-hydroxybenzyl) benzene as a stabilizer, and the polymerization reaction was continued at 250° C. Thus there was obtained a composite material.

EXAMPLE 4

The same procedure as in Example 3 was repeated to prepare a composite material except that 1,3,5-trimethyl-2,4,6-tris(3,5-di-t-butyl-4-hydroxybenzyl) benzene as a stabilizer was replaced by 1 g of N,N'-hexamethylenebis(3,5-di-t-butyl-4-hydroxyhydrocinnamamide) and 1 g of tris(2,4-di-t-butylphenyl)phosphite.

EXAMPLE 5

The same procedure as in Example 4 was repeated to produce a composite material except that the mixture of ε-caprolactam and 6-aminocaproic acid as the polyamide monomer was replaced by 100 g of 6-aminocaproic acid alone.

COMPARATIVE EXAMPLE 3

The same procedure as in Example 3 was repeated to produce a composite material except that the stabilizer was not used.

COMPARATIVE EXAMPLE 4

The same procedure as in Example 3 was repeated to produce a composite material except that the clay mineral was not used.

COMPARATIVE EXAMPLE 5

The same procedure as in Example 3 was repeated to produce a composite material except that the the amount of the stabilizer was changed to 0.04 g.

COMPARATIVE EXAMPLE 6

The same procedure as in Example 3 was repeated to produce a composite material except that the the amount of the stabilizer was changed to 10 g.

Measurement of characteristic properties

The characteristic properties of the composite materials prepared in Examples 3 to 5 and Comparative Examples 3 to 6 were measured as follows: The interlayer distance of the silicate was determined by X-ray diffractometry. The melting point and heat of fusion were measured by thermal analysis. Using injection-molded test pieces, light transmittance (1 mm thick specimen) at 7000 Å was measured by visible light absorption spectrometry, tensile test was carried out according to ASTM, and heat distortion test was carried out according to ASTM. The results are shown in Table 2.

It is noted from Table 2 that the composite materials prepared in Examples have a higher visible light transmittance than those prepared in Comparative Examples. It is also noted that the composite materials prepared in Examples are comparable in mechanical properties such as tensile strength, and heat resistance to that prepared in Comparative Example 3 which contains no stabilizer.

TABLE 2

|  | Content of stabilizer (g) | Interlayer distance of silicate (Å) | Melting point (°C.) | Latent heat of fusion (J/g) | Light transmittance (%) | Tensile strength (MPa) | Tensile modulus (GPa) | Heat distortion temperature (°C.) |
|---|---|---|---|---|---|---|---|---|
| Example 3 | 2 | >100 | 218 | 73.3 | 37.5 | 107 | 1.90 | 150 |
| Example 4 | 2 | >100 | 217 | 74.0 | 38.5 | 85 | 1.85 | 147 |
| Example 5 | 2 | >100 | 216 | 71.3 | 36.6 | 79 | 1.80 | 145 |
| Comparative Example 3 | — | >100 | 217 | 75.9 | 25.7 | 79 | 1.70 | 145 |
| Comparative Example 4 | 2 | — | 217 | 73.8 | 9.2 | 70 | 1.19 | 65 |
| Comparative Example 5 | 0.04 | >100 | 217 | 75.5 | 25.8 | 79 | 1.70 | 145 |
| Comparative Example 6 | 10 | >100 | 209 | 52.1 | 15.5 | 50 | 1.71 | 85 |

What is claimed is:

1. A process for producing a composite material which comprises a contacting step of contacting a layered clay mineral having a cation exchange capability of 50 to 200 milliequivalents per 100 g with a swelling agent, thereby forming a complex which has the property of being swollen by a molten polyamide monomer, a mixing step of mixing said complex with a monomer of polyamide, and a polymerization step of polymerizing said monomer contained in said mixture by heating said mixture, and adding a substance to control the crystalline structure or molecular structure of the polyamide-containing resin in the mixing step and/or the polymerization step wherein the substance is a polyamine and is at least one member selected from diamines, triamines, and tetramines, pentamines, and aliphatic polyamines.

2. A process for producing a composite material which comprises a contacting step of contacting a layered clay mineral having a cation exchange capacity of 50 to 200 milliequivalents per 100 g with a swelling agent, thereby forming a complex which has the property of being swollen by a molten polyamide monomer, a mixing step of mixing said complex with a monomer of polyamide, and a polymerization step of polymerizing said monomer contained in said mixture by heating said mixture, and adding a substance to control the crystalline structure of molecular structure of the polyamide-containing resin in the mixing step and/or the polymerization step wherein the substance is a stabilizer and is at least one member selected from phenol derivatives and organophosphoric compound and is present in an amount of 0.05 to 5 parts by weight per 100 parts by weight of the resin.

3. A process for producing a composite material as claimed in claims 1 or 2 wherein the layered clay mineral is at least one member selected from smectite clay minerals, vermiculite, and halloysite.

4. A process for producing a composite material as claimed in claim 3 wherein the smectite clay mineral is at least one member selected from montmorillonite, saponite, beidellite, nontronite, hectorite, and stevensite.

5. A process for producing a composite material as claimed in claims 1 or 2 wherein the swelling agent is one which has an onium ion group and a functional group capable of reacting and bonding with polyamide.

6. A process for producing a composite material as claimed in claims 1 or 2 wherein the swelling agent is one which forms an onium ion having a carboxyl group represented by $(X^+-R-COOH)$, where $X^+$ is an onium ion and R is an alkylene group including a polymethylene group represented by $-(CH_2)_n-$.

7. A process for producing a composite material as claimed in claims 1 or 2 wherein the contacting step is accomplished by bringing the layered clay mineral into contact with the swelling agent in the presence of a dispersion medium to form the complex and then removing the dispersion medium to such an extent that the content of the dispersion medium in the complex is 100 to 3000 parts by weight per 100 parts by weight of the layered clay mineral.

8. A process for producing a composite material as claimed in claims 1 or 2 wherein the polyamide monomer is at least one member selected from amino acid, nylon salt, and lactam.

9. A process for producing a composite material as claimed in claims 1 or 2 wherein the polyamide monomer is lactam and ω-amino acid is added in the mixing step in an amount of 1 to 20 parts by weight for 100 parts by weight of lactam.

10. A process for producing a composite material as claimed in claim 1 wherein the polyamine is added in such an amount that the amount of the amino group in the polyamine is 0.2-2.0 equivalents for the total ion exchange capacity of the clay mineral.

11. A process for producing a composite material as claimed in claim 2, wherein the substance is a phenol derivative.

12. A process for producing a composite material as claimed in claim 2, wherein the substance is an organophosphoric compound.

* * * * *